Figure 1:
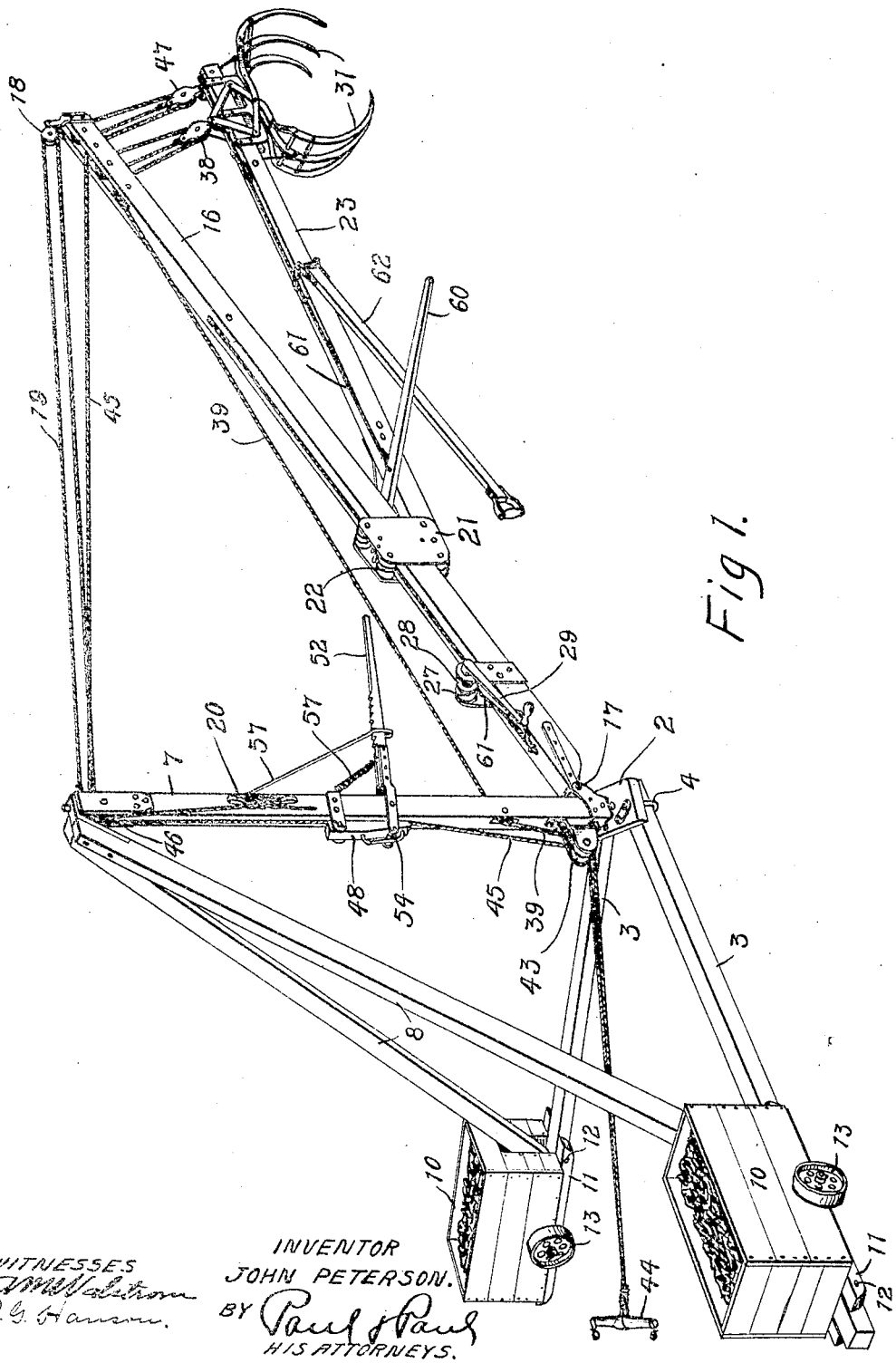

No. 875,846. PATENTED JAN. 7, 1908.
J. PETERSON.
HAY AND MANURE GATHERER AND LOADER.
APPLICATION FILED SEPT. 5, 1905.

3 SHEETS—SHEET 1.

WITNESSES
INVENTOR
JOHN PETERSON.
BY Paul & Paul
HIS ATTORNEYS.

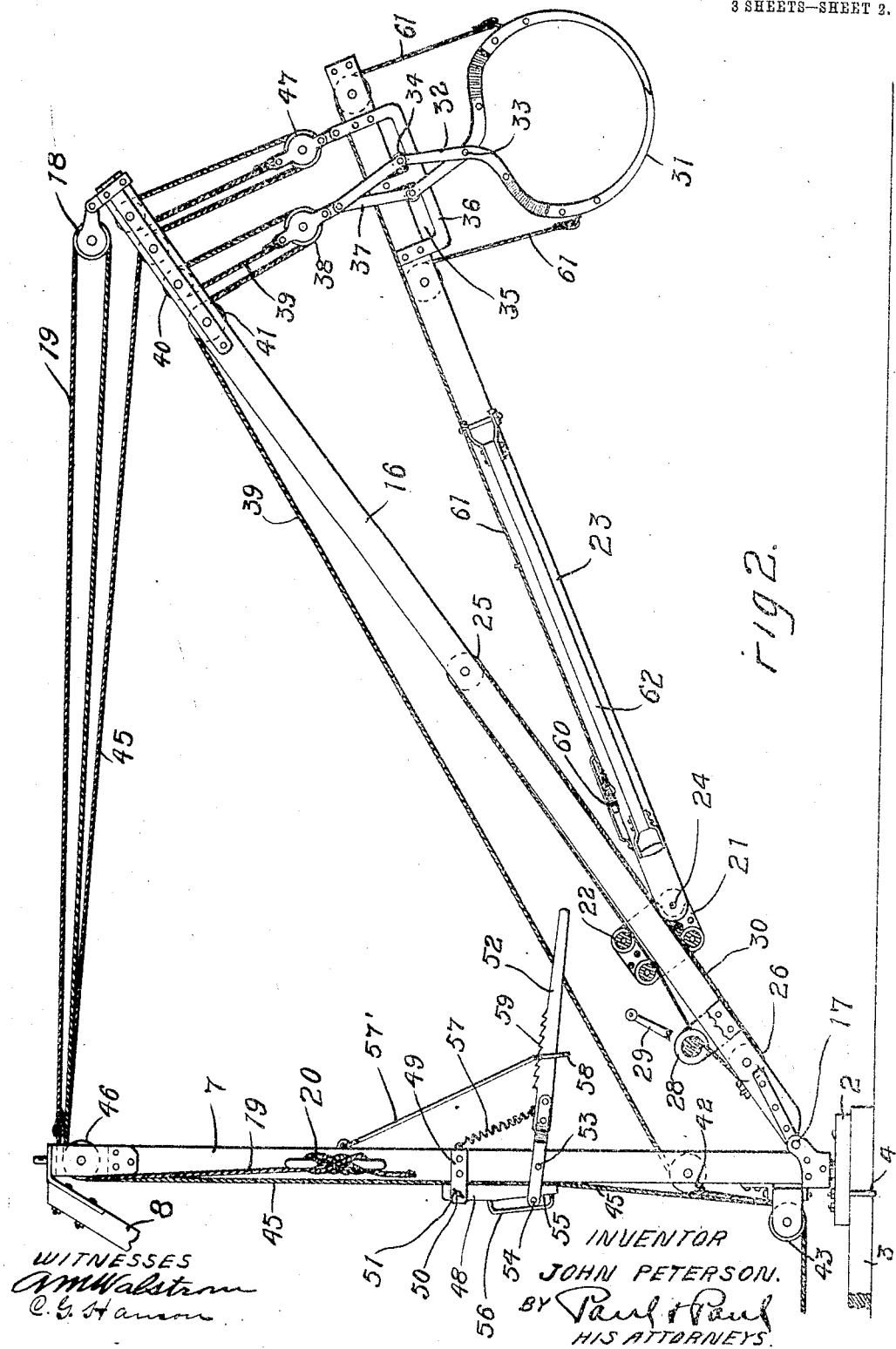

No. 875,846. PATENTED JAN. 7, 1908.
J. PETERSON.
HAY AND MANURE GATHERER AND LOADER.
APPLICATION FILED SEPT. 5, 1905.
3 SHEETS—SHEET 3.
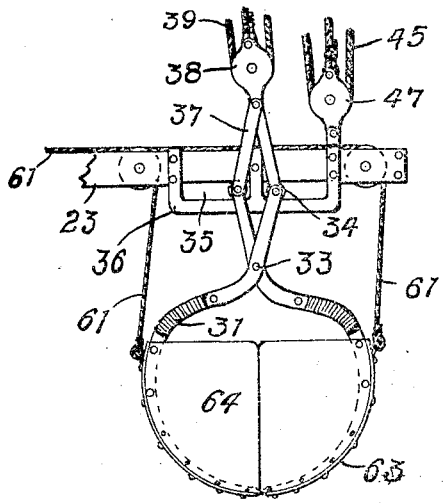
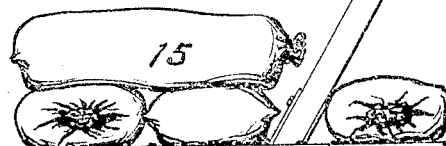
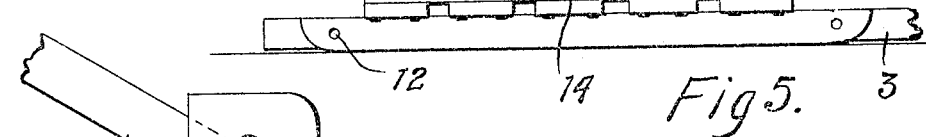
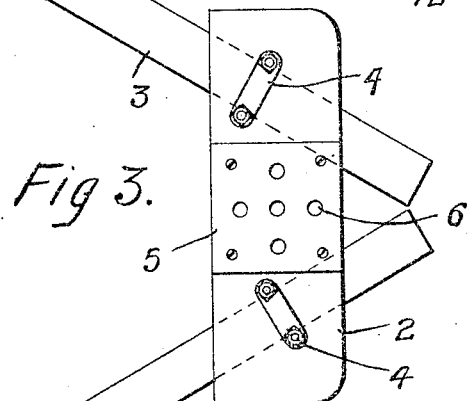
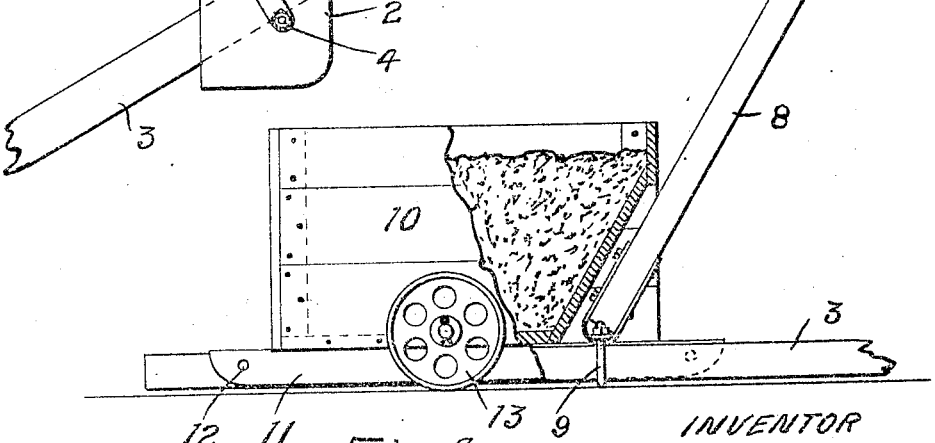
WITNESSES.
A. M. Walstrom
C. E. Hanson
INVENTOR
JOHN PETERSON.
BY Paul & Paul
HIS ATTORNEYS

UNITED STATES PATENT OFFICE.

JOHN PETERSON, OF ST. PAUL, MINNESOTA.

HAY AND MANURE GATHERER AND LOADER.

No. 875,846.

Specification of Letters Patent.

Patented Jan. 7, 1908.

Application filed September 5, 1905. Serial No. 277,057.

*To all whom it may concern:*

Be it known that I, JOHN PETERSON, of St. Paul, Ramsey county, Minnesota, have invented certain new and useful Improvements in Hay and Manure Gatherers and Loaders, of which the following is a specification.

My invention relates to that class of farm implements shown and described in Letters Patent of the United States issued to me September 13, 1898, No. 610,619; November 12, 1901, No. 686,532, and a certain pending application filed June 13, 1904, No. 212,317.

The object of my invention is to provide means for moving the fork back and forth toward or from the base of the boom, to facilitate the loading and dumping operation whereby less labor will be required to handle the apparatus.

Other objects of the invention will appear from the following detailed description.

The invention consists generally in a main boom and an auxiliary or secondary boom arranged to travel thereon and support the hay or manure gathering fork.

Further, the invention consists in an improved means for mounting the fork on the secondary boom.

Further, the invention consists in a brake device provided on the upright mast of the apparatus, and, further, the invention consists in various constructions and combinations, all as hereinafter described and particularly pointed out in the claims.

In the accompanying drawings forming part of this specification, Figure 1 is a perspective view of a hay and manure gatherer embodying my invention. Fig. 2 is a side elevation illustrating the booms raised and the fork in its closed position. Fig. 3 is a detail plan view of the plate or bed upon which the mast of the apparatus is mounted. Fig. 4 is a detail view illustrating one of the weighted boxes or anchors provided in connection with the mast guy timber. Fig. 5 is a modification illustrating the weights piled upon a movable platform. Fig. 6 is a detail view of the fork provided with closed ends and bottom to adapt it for handling sand or gravel.

In the drawing, 2 represents a base plate and 3 horizontal base timbers secured to said plate by clevises 4, and 5 a metal plate mounted upon the base 2 and provided with a series of holes 6 wherein the stud on the lower end of the upright mast 7 is inserted. The mast may be moved from one hole to another, until it has been adjusted in a perpendicular position. The top of the mast is connected by inclined timbers or braces 8 with clevises 9 provided on the base timbers 3. These clevises may be slipped along the said timbers to adjust them and the braces 8 properly with respect to the perpendicular mast. Boxes 10 adapted to contain sand or other material are mounted upon the shoes 11, which have a sufficient space between them to receive the base timber 3, and are provided with holes 12 in one end for a draft attachment. Wheels 13 are mounted upon the said boxes for convenience in moving them from place to place.

Instead of mounting a box upon the shoes 11 I may provide a platform 14 thereon, upon which bags of sand 15, or other weights, may be piled.

16 is the main boom pivoted at 17 on the lower end of the mast. A pulley block 18 is provided at the outer end of this boom, and a cable 19 has one end secured to the top of the mast and passes around this pulley block and is adjustably secured at 20 on the mast. By means of this cable the boom 16 can be adjusted at the desired inclination according to the work to be performed.

21 is a carriage having wheels 22, two of which are provided above the boom and travel thereon, and a third is provided below the boom and bears on the under side thereof when the carriage is operated. A secondary boom 23 is pivoted at 24 in said carriage, and is adapted to be moved back and forth therewith on the main boom. I prefer to provide pulleys 25 and 26 in the main boom, and a windlass device consisting of drums 27 and 28 having a crank 29 mounted on the said boom between the pulleys 25 and 26. A cable 30 has its ends attached to the carriage 21 and extending in opposite directions around the pulleys 25 and 26 and the drums 27 and 28 said cable extending along the upper and under sides of the main boom. The wheels 22 having grooved or hollow faces receive the said cable and permit movement of the carriage back and forth without interfering with the cable. When the crank 29 is turned in one direction, or another the carriage will be moved toward or from the outer end of the boom, and the distance of its travel can be readily determined by the location of the pulley 25. By increasing the distance between this pulley and the windlass the travel of the auxiliary boom can be regulated.

The fork which I prefer to use in connection with this apparatus comprises two sections or parts, each having a series of tines 31 and shanks 32 pivoted together at 33 and having rollers 34 adapted to slide in a guideway 35 formed by a bracket 36 on the under side of the boom 23. Links 37 are pivoted together at one end and pivotally connected at their other ends to the shanks 32 near the rollers 34. A pulley block 38 is attached to the links 37 and a cable 39 connected to said block and passes around pulleys 40 and 41 on the main boom, and to pulleys 42 and 43 on the mast 7, and from thence to a swingle-tree 44. A similar cable 45 is also attached to the swingle-tree and to the cable 39, and passes under the pulley 43 and over a similar pulley 46 at the top of the mast, and from thence to pulleys at the outer end of the main boom corresponding to the pulleys 40 and 41 to a block 47 which is attached to the bracket 36. By means of this last described cable, the auxiliary boom can be raised or lowered independently of the main boom. The cable 39 when tightened closes the fork to grip the load, and ordinarily both the cables 39 and 45 will be tightened simultaneously to close the fork and raise the boom and load preparatory to moving them to the point where the load is to be deposited.

To enable the operator to slack up the strain on the cable 39 and open the fork without at the same time releasing the cable 45 and lowering the boom, I provide a brake device on the mast 7, which consists preferably of a block 48 arranged between plates 49 on the mast, and having pins 50 loosely mounted in diagonal slots 51 in said plates. The cable 45 passes between the block 48 and the mast. A lever 52 is pivoted at 53 on the mast and has a roller bearing 54 on the inclined surface 55 of the block 48, being held in engagement therewith by a guide 56. When this lever is depressed the roller 54 will be moved upon the inclined surface 55 and press the cable against the mast and prevent it from slipping in either direction. A spring 57 normally holds the lever 52 in its raised position and the roller 54 out of contact with the block. A rod 57' is pivoted on the mast and has a loop 58 at its lower end to encircle the lever and engage the teeth 59 and lock the lever in any desired position. By means of this brake device the operator can clamp the cable 45 to the mast and hold the auxiliary boom at any desired inclination while the fork is being opened to discharge its contents.

To open the fork, I prefer to provide a lever 60 pivoted on the auxiliary boom and connected with the fork sections by cables 61. By gripping this lever the operator can pull the fork tines apart and allow the load to be discharged between them. A pivoted handle 62 is mounted on the auxiliary boom for convenience in swinging it and the main boom from place to place.

It is sometimes desirable in an apparatus of this kind to handle very fine manure, or sand or gravel, and I therefore provide a sheet metal bottom 63 and end plates 64 for the fork, said plates being secured respectively to the fork sections, and having close fitting abutting edges, as shown in Fig. 6, to form a bucket or receptacle in which the fine material can be gathered and transferred from one plate to another.

I claim as my invention:

1. The combination with a main boom, of an auxiliary boom pivoted thereon, a fork carried by said auxiliary boom, a block and tackle connected to said auxiliary boom and fork and extending to a source of power for simultaneously closing said fork and raising said auxiliary boom, and means carried by said auxiliary boom for positively opening said fork, substantially as described.

2. The combination with a main boom, of an auxiliary boom pivotally and slidably mounted upon said main boom, means carried by the main boom for adjusting the auxiliary boom back and forth thereon, a gathering fork carried by the auxiliary boom, and means connecting said auxiliary boom and fork with a source of power for simultaneously closing said fork and raising said auxiliary boom without elevating the main boom, substantially as described.

3. The combination, with a main boom, of an auxiliary boom pivoted thereon, a gathering fork supported on said auxiliary boom, suitable connections provided between said auxiliary boom and said fork, and a suitable source of power whereby said fork will be closed and said boom raised simultaneously, and a brake device arranged to clamp the connection between said boom and the source of power, for the purpose specified.

4. The combination, with a mast and a main boom pivoted thereon, of an auxiliary boom pivoted on said main boom, a gathering fork carried by said auxiliary boom, block and cable connections provided between said auxiliary boom and said fork and a suitable source of power, and a brake device arranged on said mast and arranged to clamp the cable connecting said auxiliary boom and the source of power, for the purpose specified.

In witness whereof, I have hereunto set my hand this first day of September, 1905.

JOHN PETERSON.

Witnesses:
RICHARD PAUL,
C. G. HANSON.